(12) United States Patent
Nanda

(10) Patent No.: US 11,143,058 B2
(45) Date of Patent: Oct. 12, 2021

(54) EXHAUST DEVICE AND AN ASSOCIATED METHOD THEREOF

(71) Applicant: General Electric Company, Schenectady, NY (US)

(72) Inventor: Deepesh Dinesh Nanda, Bangalore (IN)

(73) Assignee: General Electric Company, Schenectady, NY (US)

(*) Notice: Subject to any disclaimer, the term of this patent is extended or adjusted under 35 U.S.C. 154(b) by 118 days.

(21) Appl. No.: 16/226,541

(22) Filed: Dec. 19, 2018

(65) Prior Publication Data

US 2019/0186300 A1    Jun. 20, 2019

(30) Foreign Application Priority Data

Dec. 20, 2017  (IN) .............................. 201741045773

(51) Int. Cl.
| | | |
|---|---|---|
| *F01K 23/10* | (2006.01) |
| *F01D 25/30* | (2006.01) |
| *F01N 5/02* | (2006.01) |
| *F22B 1/18* | (2006.01) |

(52) U.S. Cl.
CPC ............ *F01K 23/10* (2013.01); *F01D 25/305* (2013.01); *F01N 5/02* (2013.01); *F22B 1/1815* (2013.01); *F01N 2240/20* (2013.01)

(58) Field of Classification Search
CPC ........ F01D 25/30; F01D 25/305; F01K 23/10; Y02E 20/16
See application file for complete search history.

(56) References Cited

U.S. PATENT DOCUMENTS

| | | | | |
|---|---|---|---|---|
| 7,707,818 | B2* | 5/2010 | Venkataraman | ........ F01D 25/30 181/213 |
| 8,317,467 | B2* | 11/2012 | Dalsania | ................. F01D 25/30 415/207 |
| 9,068,506 | B2* | 6/2015 | Eleftheriou | ............. F01D 25/30 |
| 2012/0174586 | A1* | 7/2012 | Alexander | .............. F01D 25/30 60/694 |
| 2013/0022444 | A1 | 1/2013 | Neeli et al. | |
| 2015/0240667 | A1 | 8/2015 | Nanda et al. | |

FOREIGN PATENT DOCUMENTS

| | | |
|---|---|---|
| FR | 2978200 A1 | 1/2013 |
| WO | 2017026904 A1 | 2/2017 |

OTHER PUBLICATIONS

Indian Office Action for IN Application No. 201741045773 dated Aug. 31, 2020; 4 pgs.

* cited by examiner

*Primary Examiner* — Todd E Manahan
*Assistant Examiner* — Thuyhang N Nguyen
(74) *Attorney, Agent, or Firm* — Fletcher Yoder, P.C.

(57) ABSTRACT

An exhaust device for a combined cycle power plant, includes a diffuser and a plenum. The diffuser includes a first wall, a second wall, a diffuser inlet, a diffuser outlet, and a diffuser flow path. The first and second walls extend circumferentially about a centerline axis of the exhaust device. The second wall is spaced from the first wall. The diffuser flow path is defined between the first and second walls, and extends from the diffuser inlet to outlet. The plenum includes an inlet wall portion and a non-circular plenum outlet, where the inlet wall portion is coupled to the diffuser outlet. The non-circular plenum outlet is spaced from the diffuser outlet along an axial direction of the exhaust device.

20 Claims, 6 Drawing Sheets

EXHAUST DEVICE AND AN ASSOCIATED METHOD THEREOF

CROSS-REFERENCE TO RELATED APPLICATION

This application claims priority to and benefit of India Patent Application No. 201741045773, entitled "EXHAUST DEVICE AND AN ASSOCIATED METHOD THEREOF", filed Dec. 20, 2017, which is herein incorporated by reference in its entirety.

BACKGROUND

Embodiments of the present specification relate generally to an exhaust device, and more particularly to the exhaust device used in a combined cycle power plant with an associated method thereof.

A combined cycle power plant generally includes a gas turbine used to extract energy from a combustion fluid received from a combustor and generate an exhaust fluid. Heat recovery steam generator (HRSG) is used to receive the exhaust fluid from the gas turbine via an exhaust device and generate power using waste heat recovered from the exhaust fluid. Typically, the exhaust device is used to reduce velocity of a flow of the exhaust fluid to recover a static pressure and temperature in the exhaust fluid, before directing the exhaust fluid to the HRSG. Generally, performance of the exhaust device may be dependent on a Mach number (i.e., velocity) of the exhaust fluid that enters and leaves the exhaust device. Such a conventional exhaust device has a cylindrical shape, which allows the exhaust fluid to enter and leave the exhaust device along an axial direction of the gas turbine engine. Hence, the conventional exhaust device does not effectively reduce the velocity of the exhaust fluid having a substantially high Mach number. Thus, the conventional exhaust device may result in discharging the exhaust fluid having substantially high Mach number to the HRSG, thereby affecting performance of the HRSG. Further, a conventional exhaust device may have a circular exit and the HRSG has a non-circular inlet, thereby necessitating a need for a transition component to be provided between the conventional exhaust device and the HRSG. As a result, a foot print of the combined cycle power plant is increased.

Accordingly, there is a need for an improved exhaust device and an associated method.

BRIEF DESCRIPTION

In accordance with one embodiment of the present specification, an exhaust device for a combined cycle power plant, is disclosed. The exhaust device includes a diffuser and a plenum. The diffuser includes a first wall, a second wall, a diffuser inlet, a diffuser outlet, and a diffuser flow path. The first wall extends circumferentially about a centerline axis of the exhaust device. The second wall extends circumferentially about the centerline axis and spaced from the first wall. The diffuser flow path is defined between the first and second walls, and extends from the diffuser inlet to the diffuser outlet. The plenum includes an inlet wall portion and a non-circular plenum outlet, where the inlet wall portion is coupled to the diffuser outlet. The non-circular plenum outlet is spaced from the diffuser outlet along an axial direction of the exhaust device.

In accordance with another embodiment of the present specification, a combined cycle power plant is disclosed. The combined cycle power plant includes an upstream device, an exhaust device, and a downstream device. The upstream device includes an outlet. The exhaust device includes a diffuser and a plenum. The diffuser includes a first wall, a second wall, a diffuser inlet, a diffuser outlet, and a diffuser flow path. The first wall extends circumferentially about a centerline axis of the exhaust device. The second wall extends circumferentially about the centerline axis and spaced from the first wall. The diffuser inlet is coupled to the turbine outlet. The diffuser flow path is defined between the first and second walls, and extends from the diffuser inlet to the diffuser outlet. The plenum includes an inlet wall portion and a non-circular plenum outlet, where the inlet wall portion is coupled to the diffuser outlet. The non-circular plenum outlet is spaced from the diffuser outlet along an axial direction of the exhaust device. The downstream device includes an inlet coupled to the non-circular plenum outlet. The upstream device includes a turbine and the downstream device includes one of a heat recovery steam generator (HRSG) and a silencer.

In accordance with yet another aspect of the present specification, a method of operating an exhaust device in a combined cycle power plant, is disclosed. The method involves receiving a fluid along an axial direction from an upstream device into a diffuser of an exhaust device. Further, the method involves directing the fluid from a diffuser inlet to a diffuser outlet along a diffuser flow path defined between a first wall and a second wall of the diffuser. The method further involves directing the fluid along a radial direction from the diffuser outlet into a plenum of the exhaust device, where an inlet wall portion of the plenum is coupled to the diffuser outlet. Further, the method involves dispersing the fluid in the diffuser and the plenum, and discharging the fluid from the plenum to a downstream device via a non-circular plenum outlet. The non-circular plenum outlet is spaced from the diffuser outlet along the axial direction.

DRAWINGS

These and other features and aspects of embodiments of the present specification will become better understood when the following detailed description is read with reference to the accompanying drawings in which like characters represent like parts throughout the drawings, wherein.

DETAILED DESCRIPTION

Embodiments discussed herein disclose an exhaust device for a combined cycle power plant. In some embodiments, the exhaust device includes a diffuser and a plenum. The diffuser includes a first wall, a second wall, a diffuser inlet, a diffuser outlet, and a diffuser flow path. The first wall extends circumferentially about a centerline axis of the exhaust device. The second wall extends circumferentially about the centerline axis and spaced from the first wall. The diffuser flow path is defined between the first and second walls, and extends from the diffuser inlet to the diffuser outlet. The plenum includes an inlet wall portion and a non-circular plenum outlet, where the inlet wall portion is coupled to the diffuser outlet. The non-circular plenum outlet is spaced from the diffuser outlet along an axial direction of the exhaust device. In some embodiments, the exhaust device is disposed between an upstream device and a downstream device of the combined cycle power plant. In one embodiment, the upstream device includes an outlet coupled to the diffuser inlet and the downstream device includes an inlet coupled to the non-circular plenum outlet. In one or more embodiments, the upstream device may include a turbine and the downstream device include one of a silencer and a heat recovery steam generator (HRSG). In one or more embodiments, each of the first wall and the second wall includes an axially extending portion defining the diffuser inlet and a radially extending portion defining the diffuser outlet. The plenum further includes an intermediate wall portion, an outlet wall portion, and a plenum flow path defined along the axial direction from the diffuser outlet to the non-circular plenum outlet.

The exemplary exhaust device may be used to efficiently reduce a velocity of a fluid and increase a static pressure and a temperature of the fluid along the diffuser and plenum flow paths irrespective of Mach number of the fluid been directed from the upstream device to the exhaust device. Thus, the exemplary exhaust device may prevent damage caused to the downstream device by the flow of the exhaust fluid having a high Mach number. Further, the exhaust device having the non-circular outlet is directly coupled to the downstream device having a non-circular inlet. Hence, there is no need for a transition component (or element) to be provided between the downstream device and the exhaust device, thereby reducing the overall footprint. Thus, the exemplary exhaust device may decrease a foot-print and cost of the combined cycle power plant.

In some embodiments, the diffuser and the plenum are integrated to each other to form a monolithic exhaust device. In such an embodiment, the monolithic exhaust device is a unitary piece and may be manufactured using additive manufacturing techniques.

Figure 1:
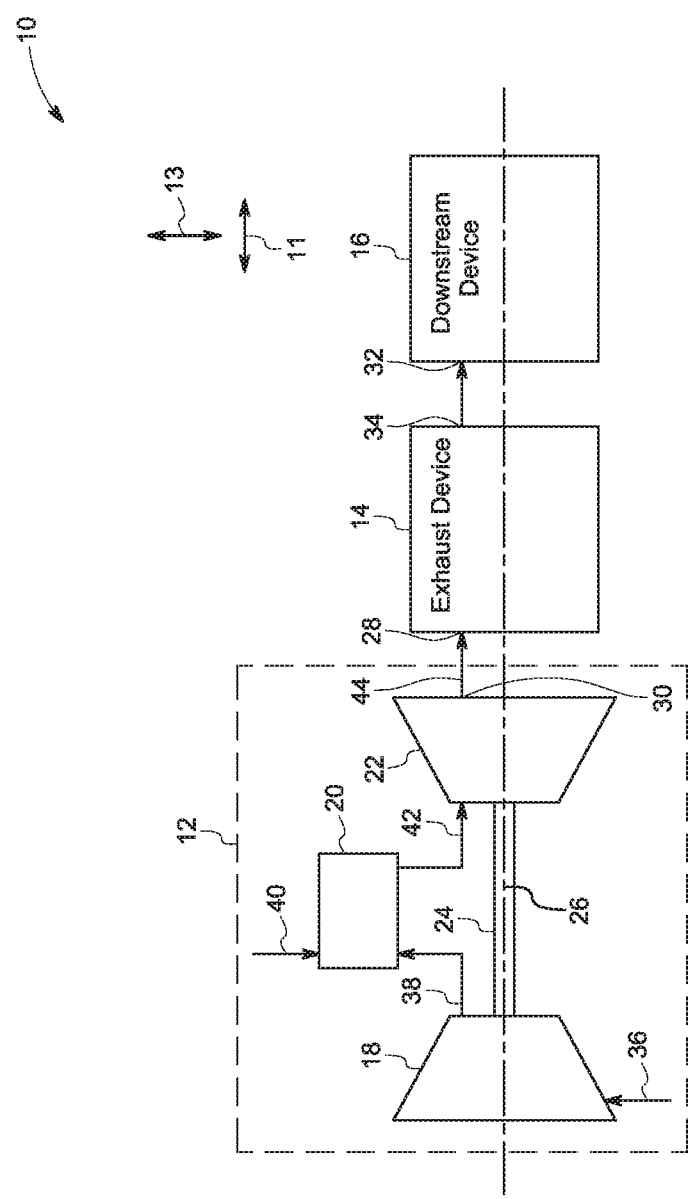
FIG. 1 is a block diagram of a combined cycle power plant, in accordance with embodiments of the present specification.

FIG. 1 illustrates a block diagram of a combined cycle power plant 10 in accordance with one embodiment of the present specification. In one embodiment, the combined cycle power plant 10 includes an upstream device 12, an exhaust device 14, and a downstream device 16. In the illustrated embodiment, the exhaust device 14 is coupled to and disposed between the upstream device 12 and the downstream device 16. It should be noted that, as used herein, the term "coupled" is not limited to a direct mechanical, electrical, and/or communication connection between components, but may also include an indirect mechanical, electrical, and/or communication connection between components. In some embodiments, the upstream device 12 and the exhaust device 14 may be integrated to each other to form a unitary piece. In other words, the exhaust device 14 may be an integral component of the upstream device 12.

In one or more embodiments, the upstream device 12 is a turbomachine, for example, a gas turbine engine. The upstream device 12 includes a compressor 18, a combustor 20 coupled to the compressor 18, a turbine 22 coupled to the combustor 20. The turbine 22 is coupled to the compressor 18 via a shaft 24. The shaft 24 is configured to rotate about the centerline axis 26.

In one or more embodiments, the exhaust device 14 is a diffuser assembly having a diffuser and a plenum coupled to each other. In some embodiments, the diffuser and the plenum are integrated to each other to form a monolithic exhaust device. In such an embodiment, the monolithic exhaust device is a unitary piece and may be manufactured using additive manufacturing techniques. As used herein the term "monolithic structure" refers to a continuous structure that is substantially free of any joints. In one example, the monolithic structure may be a unitary structure devoid of any joined parts or layers. In some embodiments, the monolithic exhaust device may be formed as one structure during processing or manufacturing, without any brazing or multiple sintering steps. The exhaust device 14 is disposed downstream relative to the upstream device 12. The exhaust device 14 includes an inlet 28 coupled to an outlet 30 of the turbine 22. In the illustrated embodiment, the inlet 28 may be a diffuser inlet. In some embodiments, the outlet 30 may be an outlet of the upstream device 12, such as a nuclear energy device, a solar energy device, and the like.

The downstream device 16 is disposed downstream relative to the exhaust device 14. The downstream device 16 includes an inlet 32 coupled to an outlet 34 of the exhaust device 14. In one or more embodiments, the outlet 34 may be a non-circular plenum outlet. In one embodiment, the downstream device 16 includes a silencer. In such an embodiment, the inlet 32 may be a silencer inlet. In some other embodiments, the downstream device 16 includes a heat recovery steam generator (HRSG). In such an embodiment, the inlet 32 may be a HRSG inlet. In some other embodiments, the downstream device 16 includes a combination of the silencer and the HRSG. In such an embodiment, the inlet 32 may be the silencer inlet and an outlet of the silencer may be coupled to the inlet of the HRSG. In one or more embodiments, each of the inlet 32 and the outlet 34 may be non-circular shaped. In some embodiments, the non-circular inlet and outlet may be rectangular-shaped. In some other embodiments, the non-circular inlet and outlet may be square-shaped.

During operation of the combined cycle power plant 10, the compressor 18 receives a fluid 36, such as air from a source, for example, an atmosphere. The compressor 18 compress the fluid 36 to generate a compressed fluid 38 having a substantially high pressure and temperature compared to the fluid 36. Further, the compressor 18 discharges the compressed fluid 38 to the combustor 20. In the combustor 20, the compressed fluid 38 is mixed with a fuel 40 and ignited to generate a combustion fluid 42 which is fed to the turbine 22. The turbine 22 expands the combustion fluid 42 to extract thermal energy from the combustion fluid 42 and convert to mechanical energy for driving the shaft 24 and generating an exhaust fluid 44. In some embodiments, the shaft 24 may be coupled to a load (not shown) such as, but not limited to, an electrical generator and/or a mechanical drive unit. The turbine 22 discharges the exhaust fluid 44 to the exhaust device 14 via the outlet 30. The exhaust device 14 reduces velocity of the exhaust fluid 44 and increase a static pressure and a temperature of the exhaust fluid 44 before discharging the exhaust fluid 44 to the downstream device 16. The exhaust device 14 is discussed in greater details below.

In one embodiment, the downstream device 16, for example, the silencer is used to reduce sound (or noise) generated by a flow of the exhaust fluid 44 before discharging the exhaust fluid 44 to an exhaust treatment device (not shown) or to the atmosphere. In some embodiments, the downstream device 16, for example, the HRSG is used to extract heat from the exhaust fluid 44 before discharging the exhaust fluid 44 to the exhaust treatment device or to the atmosphere. In some other embodiments, the downstream device 16, for example, the silencer is used to reduce the sound generated by the flow of the exhaust fluid 44 before discharging the exhaust fluid 44 to the HRSG, where the waste heat from the exhaust fluid 44 is extracted before discharging the exhaust fluid 44 to the exhaust treatment device or to the atmosphere.

Figure 2:
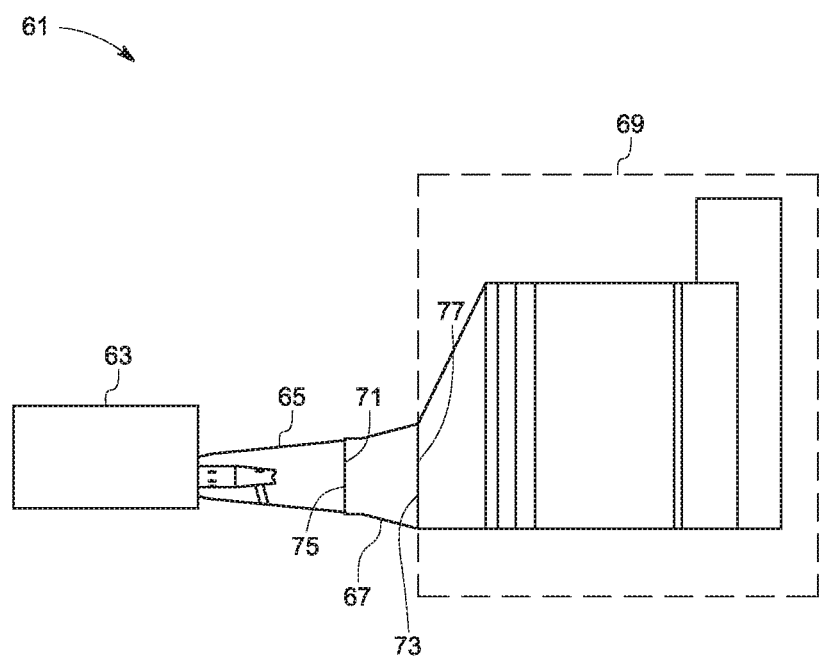
FIG. 2 is a schematic diagram of a conventional combined cycle power plant.

FIG. 2 illustrates a schematic diagram of a conventional combined cycle power plant 61 including a turbine 63, an exhaust device 65, a transition component 67, and a heat recovery steam generator (HRSG) 69. The exhaust device 65 has a circular outlet 71 and the HRSG 69 has a non-circular outlet, for example, a rectangular inlet 73. The circular outlet 71 cannot be directly coupled to the rectangular inlet 73 due to a mismatching interface. Therefore, the transition component 67 having a circular inlet 75 and a non-circular outlet, for example, a rectangular outlet 77 is used as an interfacing component between the exhaust device 65 to the HRSG 69. Thus, the transition component 67 is used to couple the exhaust device 65 to the HRSG 69. Specifically, the circular inlet 75 is coupled to the circular outlet 71, and the rectangular outlet 77 is coupled to the rectangular inlet 73. Further, the transition component 67 provides an additional space to enable reduction in velocity of flow of an exhaust fluid. However, the usage of the transition component 67 increases a foot print of the conventional combined cycle power plant 61.

Figure 3:
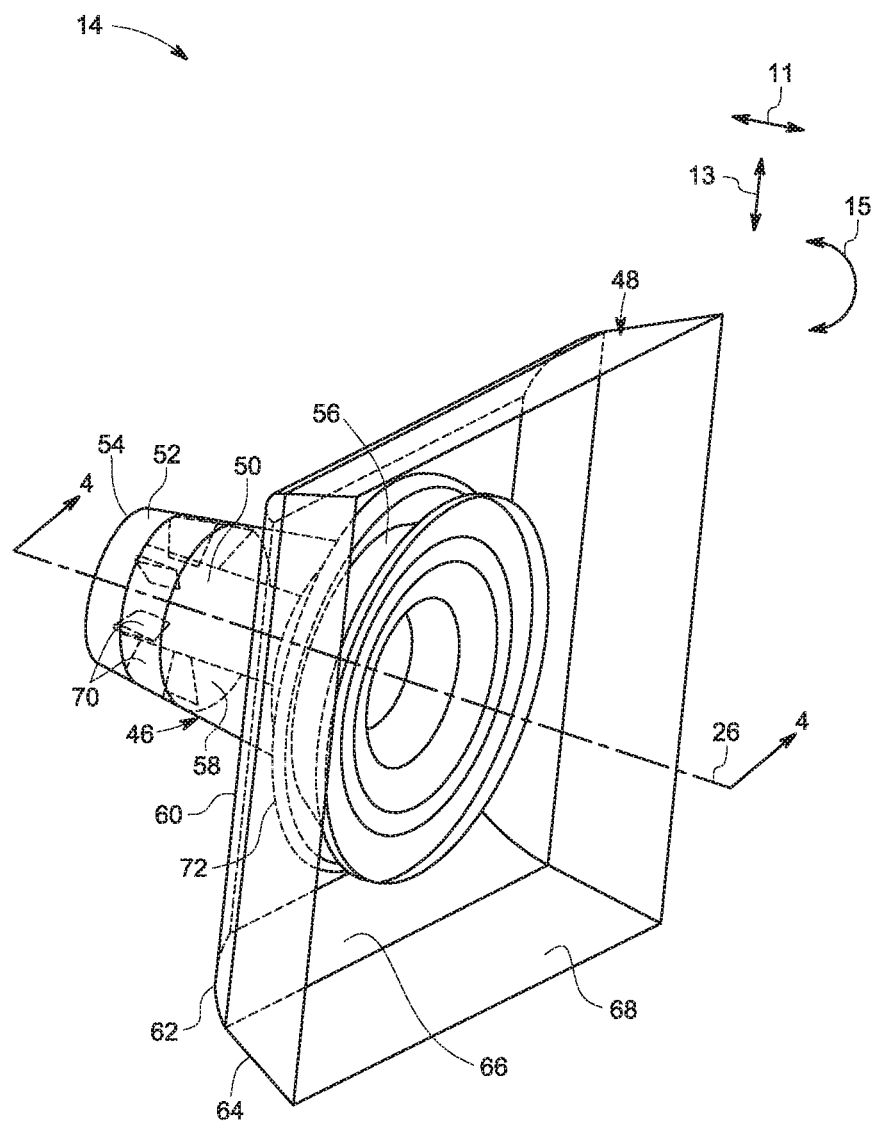
FIG. 3 is a perspective view of an exhaust device of the combined cycle power plant of FIG. 1 in accordance with the embodiment of the present specification.

FIG. 3 illustrates a perspective view of the exhaust device 14 of the combined cycle power plant of FIG. 1 in accordance with the embodiment of the present specification. In the illustrated embodiment, the exhaust device 14 is a diffuser assembly having a diffuser 46 and a plenum 48.

The diffuser 46 includes a first wall 50, a second wall 52, a diffuser inlet 54, a diffuser outlet 56, and a diffuser flow path 58. The first wall 50 extends circumferentially about the centerline axis 26 of the exhaust device 14. Similarly, the second wall 52 extends circumferentially about the centerline axis 26 and is spaced from the first wall 50 to define the diffuser flow path 58 between. The diffuser flow path 58 extends from the diffuser inlet 54 to the diffuser outlet 56. The diffuser inlet 54 is coupled to the upstream device. In the illustrated embodiment, each of the diffuser inlet 54 and the diffuser outlet 56 is circular shaped. The diffuser 46 will be discussed in greater detail below.

The plenum 48 includes an inlet wall portion 60, an intermediate wall portion 62, and an outlet wall portion 64, a plenum flow path 66, and a non-circular plenum outlet 68. The inlet wall portion 60 is coupled to the diffuser outlet 56. Specifically, the inlet wall portion 60 includes an opening 72, for example, a circular opening for connecting to the diffuser outlet 56. The intermediate wall portion 62 extends between the inlet wall portion 60 and the outlet wall portion 64. The non-circular plenum outlet 68 is spaced from the diffuser outlet 56 along an axial direction 11 of the exhaust device 14. The axial direction 11 extends parallel to the centerline axis 26 of the exhaust device 14. The inlet wall portion 60, the intermediate wall portion 62, and the outlet wall portion 64 define the plenum flow path 66 along the axial direction 11 from the diffuser outlet 56 to the non-circular plenum outlet 68. In the illustrated embodiment, the non-circular plenum outlet 68 is a rectangular-shaped outlet. In some other embodiments, the non-circular plenum outlet 68 may be a square-shaped outlet.

In the illustrated embodiment, the exhaust device 14 further includes a plurality of inlet struts 70 spaced from each other along a circumferential direction 15 and coupled to the first wall 50 and second wall 52 so as to support the diffuser 46. Specifically, each of the plurality of inlet struts 70 is coupled to an outer peripheral surface (not labeled) of the first wall 50 and an inner peripheral surface (not labeled) of the second wall 52. The plurality of inlet struts 70 is disposed proximate to the diffuser inlet 54.

Figure 4:
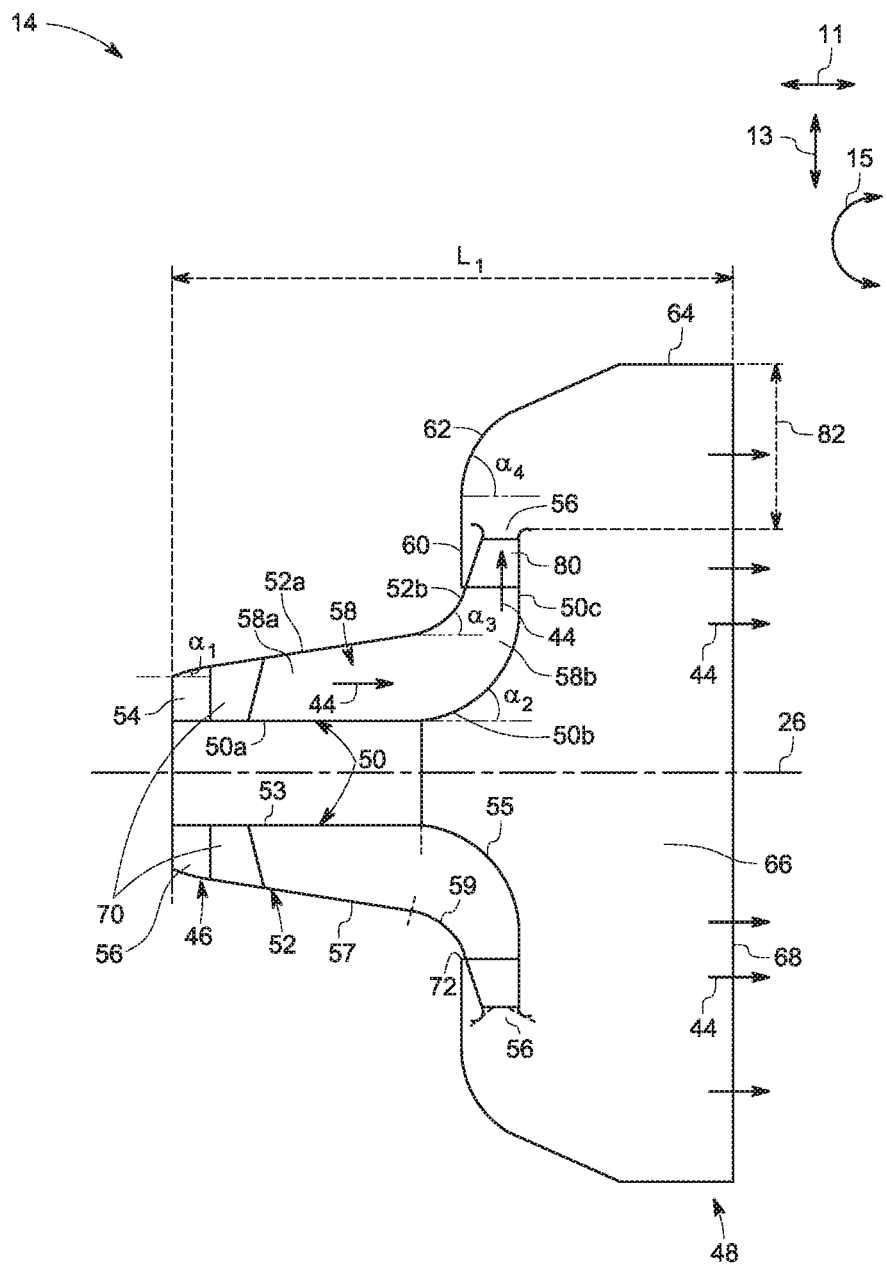
FIG. 4 is a schematic diagram of an exhaust device taken along line 4-4 of FIG. 3 in accordance with one embodiment of the present specification.

FIG. 4 is a schematic diagram of the exhaust device 14 taken along line 4-4 of FIG. 3 in accordance with one embodiment of the present specification. The exhaust device 14 includes the diffuser 46 and the plenum 48. The diffuser 46 includes the first wall 50, the second wall 52, the diffuser inlet 54, the diffuser outlet 56, and the diffuser flow path 58. In the illustrated embodiment, the diffuser inlet 54 is a circular-shaped inlet. It should be noted herein that the shape of the diffuser inlet 54 may be designed depending on a shape of the turbine outlet.

The first wall 50 and the second wall 52 include axially extending portions 53, 57 respectively defining the diffuser inlet 54. The first wall 50 and the second wall 52 includes radially extending portions 55, 59 respectively defining the diffuser outlet 56. Specifically, a first portion 50a of the axially extending portion 53 is oriented parallel to the centerline axis 26 and a first portion 52a of the axially extending portion 57 is inclined at an angle "$\alpha_1$" relative to the centerline axis 26. In such an embodiment, a portion 58a of diffuser flow path 58 has a gradually increasing width from the diffuser inlet 54 to the radially extending portion 55, 59. In one embodiment, the angle "$\alpha_1$" may be in a range from 10 degrees to 30 degrees.

The radially extending portions 55, 59 are curved relative to the axially extending portions 53, 57 respectively. Specifically, a second portion 50b of the radially extending portion 55 is curved at an angle "$\alpha_2$" relative to the first portion 50a. Further, a third portion 50c of the radially extending portion 55 extends perpendicular to the centerline axis 26. Similarly, a second portion 52b of the radially extending portion 59 is curved at an angle "$\alpha_3$" relative to the first portion 52a. In such an embodiment, another portion 58b of diffuser flow path 58 has a gradually decreasing width from the axially extending portions 53, 57 to the diffuser outlet 56. In the illustrated embodiment, the second portion 50b and the third portion 50c of the first wall 50, and the second portion 52b of the second wall 52 extend outwardly along a radial direction 13 relative to the centerline axis 26. In one embodiment, the angle "$\alpha_2$" may be in range from 20 degrees to 40 degrees and the angle "$\alpha_3$" may be in range from 20 degrees to 40 degrees.

The exhaust device 14 further includes the plurality of inlet struts 70 disposed proximate to the diffuser inlet 54 and a plurality of outlet struts 80 disposed proximate to the diffuser outlet 56. The inlet struts 70 are spaced from each other along the circumferential direction 15 of the exhaust device 14. Further, the plurality of inlet struts 70 is coupled to the first portion 50a of the first wall 50 and to the first portion 52a of the second wall 52 to support the diffuser inlet 54. The outlet struts 80 are spaced from each other along the circumferential direction 15. The plurality of outlet struts 80 is coupled to the third portion 50c of the first wall 50 and to the second portion 52b of the second wall 52 to support the diffuser outlet 56.

The plenum 48 includes the inlet wall portion 60, the outlet wall portion 64, and the intermediate wall portion 62 extending between the inlet wall portion 60 and the outlet wall portion 64, the plenum flow path 66, and the non-circular plenum outlet 68. In one embodiment, the inlet wall portion 60 extends outwardly along the radial direction 13 relative to the centerline axis 26. Further, the inlet wall portion 60 includes an opening 72 to receive and hold the diffuser 46. Specifically, in the illustrated embodiment, the inlet wall portion 60 receives a part of the radially extending portions 55, 59 via the opening 72 and couple the part of the radially extending portions 55, 59 to the plenum 48. In one embodiment, the intermediate wall portion 62 is curved at an angle "$\alpha_4$" relative to the inlet wall portion 60. Specifically, in the illustrated embodiment, the intermediate wall portion 62 is curved towards the non-circular plenum outlet 68. In one embodiment, the angle "$\alpha_4$" may be in range from 50 degrees to 80 degrees. The diffuser outlet 56 is spaced from the intermediate wall portion 62 by a radial gap 82 along the radial direction 13. The outlet wall portion 64 extends parallel relative to the centerline axis 26. Further, the inlet wall portions 60, the intermediate wall portion 62, and the outlet wall portion 64 together define the plenum flow path 66 along the axial direction 11 from the diffuser outlet 56 to the non-circular plenum outlet 68. In the illustrated embodiment, the non-circular plenum outlet 68 is a rectangular-shaped outlet. In some other embodiments, the non-circular plenum outlet 68 is a square-shaped outlet.

In some embodiments, the diffuser 46 and plenum 48 are integrated to each other to form a monolithic exhaust device. Specifically, the inlet wall portion 60 and the part of the radially extending portions 55, 59 are integrated to each other to form a unitary piece. In such embodiments, the monolithic exhaust device may be manufactured using additive manufacturing techniques. In some other embodiments, the exhaust device 14 may be manufactured using a sheet metal spinning technique. The length "$L_1$" of the exemplary exhaust device 14 is smaller compared to a conventional exhaust device.

During operation of a combined cycle power plant, the exhaust device 14 receives the exhaust fluid 44 from the upstream device, for example, the turbine. The exhaust fluid 44 enters the diffuser 46 via the diffuser inlet 54 along the axial direction 11. Specifically, the exhaust fluid 44 enters the axially extending portion 53 of the diffuser 46 along the axial direction 11. The exhaust fluid 44 is then directed from the diffuser inlet 54 to the diffuser outlet 56 along the diffuser flow path 58. Specifically, the exhaust fluid 44 enters the radially extending portions 55, 59 of the diffuser 46 from the axially extending portions 53, 57. The exhaust fluid 44 is later discharged from the diffuser 46 into the plenum 48 via the diffuser outlet 56 along the radial direction 13.

The exhaust fluid 44 is dispersed within the diffuser flow path 58 to partially recover a static pressure and a temperature of the exhaust fluid 44 before discharging it into the plenum 48. In one embodiment, the exhaust fluid 44 is dispersed in the diffuser 46 by a) reducing a velocity of the exhaust fluid 44 along the portion 58a of the diffuser flow path 58 and b) increasing the velocity of the exhaust fluid 44 along the other portion 58b of the diffuser flow path 58. In one embodiment, the gradually increasing width of the portion 58a of the diffuser flow path 58 facilitates to reduce the velocity of the exhaust fluid 44 along the axially extending portions 53, 57 of the diffuser 46. Similarly, the gradually decreasing width of the other portion 58b of the diffuser flow path 58 facilitates to increase the velocity of the exhaust fluid 44 along the radially extending portions 55, 59 of the diffuser 46.

Further, the exhaust fluid 44 discharged into the plenum 48 is directed along the plenum flow path 66 from the diffuser outlet 56 to the non-circular plenum outlet 68 along the axial direction 11. The exhaust fluid 44 is further dispersed within the plenum flow path 66 to further recover the static pressure and temperature in the exhaust fluid 44 before discharging the exhaust fluid 44 into the downstream device, for example, one of the silencer and the HRSG. In one embodiment, the exhaust fluid 44 is dispersed within the plenum 48 by a) directing the exhaust fluid 44 from the radially extending portions 55, 59 against the intermediate wall portion 62 and b) swirling the exhaust fluid 44 within the plenum flow path 66. The radial gap 82 between the intermediate wall portion 62 and the diffuser outlet 56 facilitates to reduce the velocity of the exhaust fluid 44 in the plenum 48. An area of the plenum 48 at the intermediate wall portion 62 is relatively greater than an area of the diffuser outlet 56. As the exhaust fluid 44 enters from the relatively smaller area to the relatively larger area (i.e., both in terms of axial width and radial height of the plenum 48), the velocity of the exhaust fluid 44 decreases and the static pressure of the exhaust fluid 44 increases. Further, the intermediate wall portion 62 having a curvature extending towards the non-circular plenum outlet 68 further facilitates to reduce the velocity of the exhaust fluid 44 and change the path of the exhaust fluid 44 from the radial direction 13 to the axial direction 11. It should be noted herein that the curved portion of the intermediate wall portion 62 provides increased height and/or radius to the plenum 48, thereby allowing the exhaust fluid 44 to diffuse in the plenum 48. As a result, the velocity of the exhaust fluid 44 is reduced and the static pressure of the exhaust fluid 44 is increased. The plenum flow path 66 having a substantially large volume further enables swirling of the exhaust fluid 44 to increase the velocity of the exhaust fluid 44 before discharging the exhaust fluid 44 along the axial direction 11 to the downstream device.

In accordance with the exemplary embodiment, the diffuser flow path 58 and the plenum flow path 66 enables to change the direction of flow of the exhaust fluid 44 from the axial direction 11 to radial direction 13, and then again from the radial direction 13 to the axial direction 11. Such a change in the direction of flow of the exhaust fluid enables to effectively recover the static pressure and temperature in the exhaust fluid 44 before directing the exhaust fluid 44 to the downstream device. Such a configuration of the exhaust device 14 enables to handle the flow of the exhaust fluid 44 independent of the Mach number of the exhaust fluid 44 entering and leaving the exhaust device 14. Hence, the exemplary exhaust device 14 prevents damage of the downstream device due to the flow of an exhaust fluid having a high Mach number.

Figure 5:
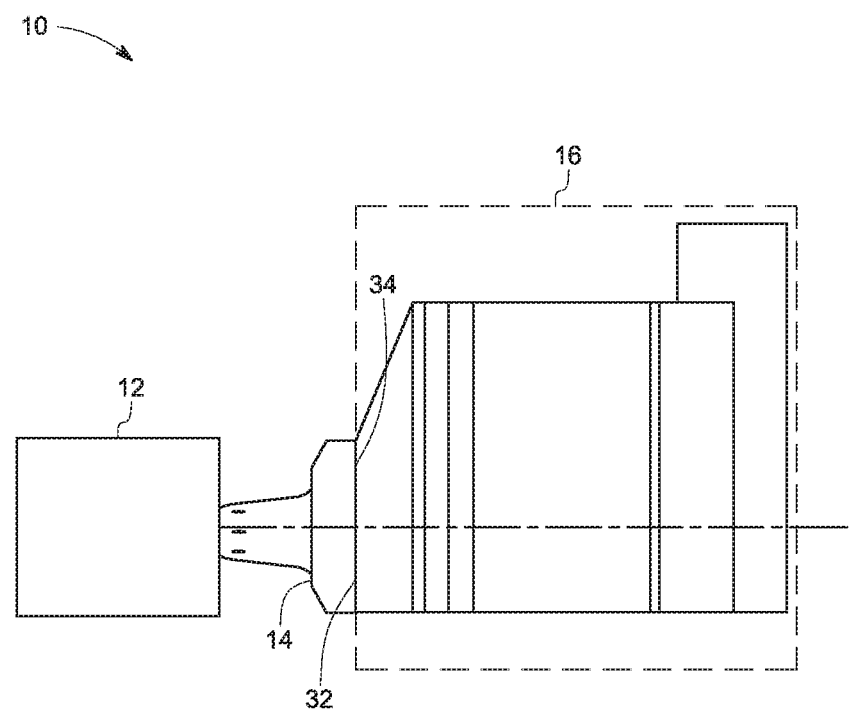
FIG. 5 is a schematic diagram of a combined cycle power plant in accordance with one embodiment of the present specification.

FIG. 5 is a schematic diagram of a combined cycle power plant 10 in accordance with one embodiment of the present specification. The combined cycle power plant 10 includes the upstream device 12, for example, a turbine, the exhaust device 14, and the downstream device 16, for example, a heat recovery steam generator (HRSG). The exhaust device 14 has the non-circular outlet 34, for example, a rectangular outlet and the downstream device 48 has the non-circular inlet 32, for example, a rectangular inlet. Thus, the exhaust device 14 is directly coupled to the upstream device 12 and the downstream device 16 since the non-circular outlet 34 and the non-circular inlet 32 have a matching interface. Specifically, the non-circular outlet 34 is directly coupled to the non-circular inlet 32. Thus, the foot print is reduced because there is no need to use a separate transition component compared to the conventional combined cycle power plant 61 of FIG. 2.

Figure 6:
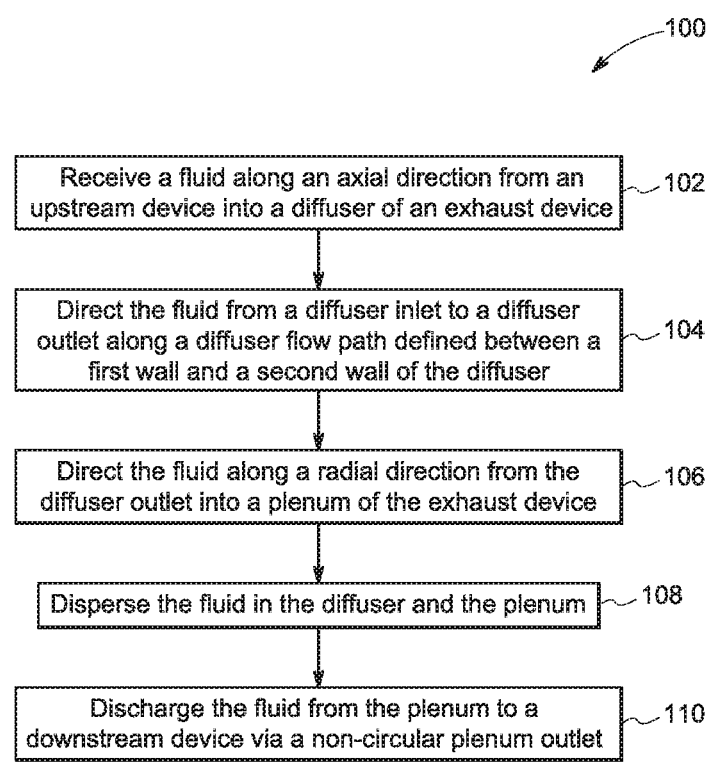
FIG. 6 is a flow chart illustrating a method of operating an exhaust device in accordance with one embodiment of the present specification.

FIG. 6 is a flow chart illustrating a method 100 of discharging an exhaust fluid from an upstream device to a downstream device via an exhaust device in accordance with one embodiment of the present specification. In one embodiment, the method 100 includes a step 102 of receiving a fluid (exhaust fluid) along an axial direction from an upstream device into a diffuser of an exhaust device. The method 100 further includes a step 104 of directing the fluid from a diffuser inlet to a diffuser outlet along a diffuser flow path defined between a first wall and a second wall of the diffuser. Further, the method 100 includes a step 106 of directing the fluid along a radial direction from the diffuser outlet into a plenum of the exhaust device. Specifically, the exhaust fluid is directed along an axial direction from the diffuser outlet to a non-circular plenum outlet via the plenum flow path. The method 100 further includes a step 108 of dispersing the fluid within the diffuser and plenum to reduce a velocity of the fluid in the exhaust device and recover a static pressure and temperature in the exhaust device. In one embodiment, the step 108 of dispersing the fluid within the diffuser includes a sub-step of a) reducing velocity of the fluid along a portion of the diffuser flow path and a sub-step of b) increasing the velocity of the fluid along another portion of the diffuser flow path. Similarly, the step 108 of dispersing the fluid within the plenum includes a sub-step of a) directing the fluid from the other portion of the diffuser flow path against an intermediate wall portion of the plenum and a sub-step of b) swirling the exhaust fluid in the plenum flow path. Further, the method 100 includes a step 110 of discharging the fluid from the plenum to a downstream device via the non-circular plenum outlet In accordance with certain embodiments discussed herein, the exemplary exhaust device may be used to efficiently reduce velocity of a fluid and increase a static pressure and temperature of the fluid along diffuser and plenum flow paths irrespective of a Mach number of the fluid. The exhaust device may prevent damage caused to the downstream device by a flow of the exhaust fluid having a high Mach number. The exhaust device having a non-circular outlet, is directly coupled to the downstream device having a non-circular inlet, thereby eliminating a need for a separate transition component between the exhaust device and the downstream device. As a result, a foot-print of the combined cycle power plant is reduced.

While only certain features of embodiments have been illustrated and described herein, many modifications and changes will occur to those skilled in the art. It is, therefore, to be understood that the appended embodiments are intended to cover all such modifications and changes as falling within the scope of the disclosed technique.

I claim:

1. An exhaust device for a combined cycle power plant, comprising:
   a diffuser comprising:
      a first wall extending circumferentially about a centerline axis of the exhaust device;
      a second wall extending circumferentially about the centerline axis and spaced from the first wall; and
      a diffuser inlet, a diffuser outlet, and a diffuser flow path defined between the first and second walls, wherein the diffuser flow path extends from the diffuser inlet to the diffuser outlet; and
   a plenum comprising an inlet wall portion and a non-circular plenum outlet configured to discharge exhaust in an axial direction relative to the centerline axis, wherein the plenum comprises a cavity disposed downstream from the diffuser, wherein the cavity extends across and is unobstructed at the centerline axis, wherein the inlet wall portion is coupled to the diffuser outlet, and wherein the non-circular plenum outlet is spaced from the diffuser outlet along the axial direction of the exhaust device,
   wherein each of the first wall and the second wall comprises an axially extending portion defining the diffuser inlet and a radially extending portion defining the diffuser outlet, such that the radially extending portion of each of the first wall and the second wall is configured to extend radially outward away from the centerline axis.

2. The exhaust device of claim 1, wherein the axially extending portion is inclined at an angle ($\alpha_1$) relative to the centerline axis, wherein the radially extending portion is curved ($\alpha_2$) relative to the axially extending portion.

3. The exhaust device of claim 1, wherein the plenum further comprises a plenum flow path, an intermediate wall portion, and an outlet wall portion, wherein the intermediate wall portion is curved ($60_4$) relative to the inlet wall portion.

4. The exhaust device of claim 3, wherein the inlet wall portion, the intermediate wall portion, and the outlet wall portion define the plenum flow path along the axial direction from the diffuser outlet to the non-circular plenum outlet.

5. The exhaust device of claim 3, wherein the diffuser outlet is spaced from the intermediate wall portion along a radial direction of the exhaust device.

6. The exhaust device of claim 1, wherein the non-circular plenum outlet comprises one of a rectangular-shaped outlet and a square-shaped outlet.

7. The exhaust device of claim 1, wherein the diffuser and the plenum are integrated to each other to form a unitary piece.

8. A combined cycle power plant comprising:
   an upstream device comprises an outlet, wherein the upstream device comprises a turbine;
   an exhaust device comprising:
      a diffuser comprising:
         an inner wall extending circumferentially about a centerline axis of the exhaust device;
         an outer wall extending circumferentially about the centerline axis and spaced radially outward from the inner wall; and
         a diffuser inlet coupled to the outlet, a diffuser outlet, and a diffuser flow path defined between interior surfaces of the inner and outer walls, wherein the diffuser flow path extends from the diffuser inlet to the diffuser outlet, wherein the inner and outer walls of the diffuser turn radially outward away from the centerline axis between the diffuser inlet and the diffuser outlet; and
      a plenum comprising an inlet wall portion and a non-circular plenum outlet,
   wherein the plenum comprises a cavity disposed downstream from the diffuser, wherein the cavity is in fluid communication with the diffuser flow path, wherein the cavity extends along an exterior surface of the inner wall of the diffuser, wherein the inlet wall portion is coupled to the diffuser outlet, and wherein the non-circular plenum outlet is spaced from the diffuser outlet along an axial direction relative to the centerline axis of the exhaust device; and
   a downstream device comprising an inlet coupled to the non-circular plenum outlet, wherein the non-circular plenum outlet is configured to discharge exhaust to the inlet in the axial direction relative to the centerline axis, wherein the downstream device comprises at least one of a heat recovery steam generator (HRSG) and a silencer.

9. The combined cycle power plant of claim 8, wherein each of the inner wall and the outer wall comprises an axially extending portion defining the diffuser inlet and a radially extending portion defining the diffuser outlet.

10. The combined cycle power plant of claim 9, wherein the axially extending portion is inclined at an angle ($\alpha_1$) relative to the centerline axis, wherein the radially extending portion is curved ($\alpha_2$) relative to the axially extending portion.

11. The combined cycle power plant of claim 8, wherein the plenum further comprises a plenum flow path, an intermediate wall portion, and an outlet wall portion, wherein the intermediate wall portion is curved ($\alpha_4$) relative to the inlet wall portion.

12. The combined cycle power plant of claim 11, wherein the inlet wall portion, the intermediate wall portion, and the outlet wall portion define the plenum flow path along the axial direction from the diffuser outlet to the non-circular plenum outlet.

13. The combined cycle power plant of claim 11, wherein the diffuser outlet is spaced from the intermediate wall portion along a radial direction of the exhaust device.

14. The combined cycle power plant of claim 8, wherein the non-circular plenum outlet comprises one of a rectangular-shaped outlet and a square-shaped outlet.

15. The combined cycle power plant of claim 8, wherein the cavity extends across and is unobstructed at the centerline axis.

16. A method of operating an exhaust device in a combined cycle power plant, comprising:
receiving a fluid along an axial direction from an upstream device into a diffuser of an exhaust device;
directing the fluid from a diffuser inlet to a diffuser outlet along a diffuser flow path defined between an inner wall and an outer wall of the diffuser, wherein the inner wall extends circumferentially about a centerline axis of the exhaust device, wherein the outer wall extends circumferentially about the centerline axis and is spaced radially outward from the inner wall;
directing the fluid along a radial direction from the diffuser outlet into a plenum of the exhaust device, wherein the inner and outer walls of the diffuser turn radially outward away from the centerline axis between the diffuser inlet and the diffuser outlet, wherein an inlet wall portion of the plenum is coupled to the outer wall of the diffuser at a position between the diffuser inlet and the diffuser outlet, wherein the inlet wall portion is angled away from the outer wall of the diffuser;
dispersing the fluid in the diffuser and the plenum; and
discharging the fluid from the plenum axially to a downstream device via a non-circular plenum outlet disposed along the centerline axis, wherein the non-circular plenum outlet is spaced from the diffuser outlet along the axial direction.

17. The method of claim 16, wherein dispersing the fluid in the diffuser comprises:
reducing a velocity of the fluid along a portion of the diffuser flow path defined by an axially extending portion of the diffuser; and
increasing the velocity of the fluid along another portion of the diffuser flow path defined by a radially extending portion of the diffuser before directing the fluid into the plenum.

18. The method of claim 17, wherein dispersing the fluid in the plenum comprises:
directing the fluid against an intermediate wall portion formed between the inlet wall portion and an outlet wall portion of the plenum, wherein the a first section of the intermediate wall portion is curved relative to the inlet wall portion, wherein a second section of the intermediate wall portion is angled relative to the inlet wall portion, wherein the intermediate wall portion is symmetrical about the centerline axis, and wherein the diffuser outlet is spaced from the intermediate wall portion along the radial direction; and
swirling the fluid in a plenum flow path defined by the inlet wall portion, the intermediate wall portion, and the outlet wall portion before discharging the fluid to the downstream device along the axial direction.

19. The method of claim 16, wherein the upstream device comprises a turbine, wherein the downstream device comprises at least one of a heat recovery steam generator (HRSG) and a silencer.

20. The method of claim 16, wherein the plenum comprises a cavity disposed downstream from the diffuser, wherein the cavity extends across and is unobstructed at the centerline axis.

* * * * *